United States Patent [19]

Evans

[11] Patent Number: 5,322,145
[45] Date of Patent: Jun. 21, 1994

[54] DRUM BRAKE OPERATING MECHANISM

[75] Inventor: Anthony C. Evans, Northville, Mich.

[73] Assignee: Kelsey-Hayes Company, Romulus, Mich.

[21] Appl. No.: 6,348

[22] Filed: Jan. 19, 1993

Related U.S. Application Data

[63] Continuation-in-part of Ser. No. 668,370, Mar. 26, 1991, Pat. No. 5,180,037, which is a continuation of Ser. No. 400,218, Aug. 29, 1989, abandoned.

[51] Int. Cl.$^5$ ............................................. F16D 63/00
[52] U.S. Cl. ........................... 188/70 R; 188/106 F; 188/325; 188/331; 188/341; 188/106 A; 188/205 R
[58] Field of Search ................ 188/2 D, 70 R, 20 B, 188/106 F, 106 A, 325-341, 205, 206, 71.1, 343, 73.43-73.45, 361, 342, 362, 79.51, 196 R, 196 BA, 196 D, 218 A; 74/105, 471 R, 501.5 R, 501.6, 502.4, 502.5, 502.6, 102, 110; 192/99 B, 75

[56] References Cited

U.S. PATENT DOCUMENTS

| | | |
|---|---|---|
| 1,186,743 | 6/1916 | Brush . |
| 1,490,639 | 4/1924 | Schaeffer . |
| 1,536,640 | 5/1925 | Vanderbeek . |
| 1,726,712 | 9/1929 | Newcomb et al. . |
| 1,829,307 | 10/1931 | Sneed .................................. 188/336 |
| 1,837,573 | 12/1931 | Mox ................................ 188/342 X |
| 1,871,260 | 8/1932 | Delahaye . |
| 1,913,156 | 6/1933 | Frehse . |
| 1,940,022 | 12/1933 | Schnell . |
| 1,962,081 | 6/1934 | Krieg ................................... 188/331 |
| 1,990,971 | 2/1935 | Apple . |
| 1,994,823 | 3/1935 | Kohr . |
| 1,996,235 | 4/1935 | Dodge . |
| 2,006,494 | 7/1935 | Bendix et al. . |
| 2,009,100 | 7/1935 | Taylor . |
| 2,036,385 | 4/1936 | Amirault . |
| 2,066,308 | 12/1936 | Pomeroy et al. . |
| 2,081,588 | 5/1937 | Brie . |
| 2,109,013 | 2/1938 | Main et al. ........................... 188/327 |
| 2,118,188 | 5/1938 | Gallup . |
| 2,131,369 | 9/1938 | Brisson . |
| 2,161,640 | 6/1939 | Schnell . |
| 2,259,266 | 10/1941 | Rabe . |
| 2,287,239 | 6/1942 | Goepfrich . |
| 2,372,319 | 3/1945 | Francois . |
| 2,503,489 | 4/1950 | James, Jr. . |
| 2,657,768 | 11/1953 | Hunyady . |
| 2,945,564 | 7/1960 | House et al. . |
| 3,023,853 | 3/1962 | Nawrot . |

(List continued on next page.)

FOREIGN PATENT DOCUMENTS

| | | | |
|---|---|---|---|
| 2055413 | 5/1972 | Fed. Rep. of Germany ...... | 188/328 |
| 2081826 | 2/1982 | United Kingdom ............... | 188/342 |

*Primary Examiner*—Douglas C. Butler
*Attorney, Agent, or Firm*—MacMillan, Sobanski & Todd

[57] ABSTRACT

An improved operating mechanism for a drum brake assembly including a mounting flange for securing the brake assembly to a vehicle component, a hollow abutment block secured to the mounting flange, and a backing plate secured to the mounting flange. A pair of arcuate drum brake shoes are supported relative to the backing plate. The hollow abutment block located on the mounting flange between a pair of adjacent ends of the brake shoes. According to one feature of the present invention, the operating mechanism is at least partially disposed in the chamber for engaging and actuating the brake shoes, and is coupled to an actuation cable having an end portion supported in a generally perpendicular relationship relative to the backing plate. According to another feature of the present invention, the operating mechanism includes at least two juxtaposed elongated links disposed between the brake shoes each including an angled elongated slotted opening formed therein, and an actuating arm oriented generally perpendicular to the links. The actuating arm is engageable with each of the slotted openings for effecting lengthwise movement of the links in opposite directions to engage and cause outward movement of the brake shoes when the actuating arm is moved generally perpendicularly in one direction relative to the links.

18 Claims, 6 Drawing Sheets

U.S. PATENT DOCUMENTS

| | | |
|---|---|---|
| 3,482,657 | 12/1969 | Zeitrager .................... 188/106 F X |
| 3,498,419 | 3/1970 | Belart ................................. 188/327 |
| 3,575,266 | 4/1971 | Sitchin . |
| 3,581,847 | 6/1971 | Torii . |
| 3,811,537 | 5/1974 | Margetts . |
| 3,850,266 | 11/1974 | Hesskamp et al. . |
| 3,870,131 | 3/1975 | Firth et al. . |
| 3,934,684 | 1/1976 | Evans . |
| 4,018,312 | 4/1977 | Muramoto et al. . |
| 4,533,113 | 8/1985 | Francart, Jr. ...................... 74/105 X |
| 4,757,882 | 7/1988 | Idesawa . |
| 4,800,993 | 1/1989 | Weber . |
| 4,844,212 | 7/1989 | Rodino et al. . |
| 4,854,423 | 8/1989 | Evans et al. . |
| 4,887,698 | 12/1989 | Hunt et al. . |
| 5,180,037 | 1/1993 | Evans .......................... 188/106 F X |

DRUM BRAKE OPERATING MECHANISM

CROSS REFERENCE TO RELATED APPLICATIONS

This application is a continuation-in-part of U.S. application Ser. No. 07/668,370, filed Mar. 26, 1991, now U.S. Pat. No. 5,180,037, and herein incorporated by reference, which is a continuation of U.S. patent application Ser. No. 07/400,218, filed Aug. 29, 1989, now abandoned.

BACKGROUND OF THE INVENTION

This invention relates in general to a drum brake assembly and, in particular, to an improved operating mechanism which can effectively be used in a drum-in-hat parking and emergency brake assembly of a hydraulic disc brake.

In most vehicle designs, the drum brake assembly includes a parking and emergency brake actuation cable which is oriented generally parallel to a backing plate of the brake assembly or perpendicular to an axle of the vehicle. However, in some vehicle designs, due to the arrangement of various components, it is not possible to orient the parking and emergency brake actuation cable parallel to the backing plate. In these instances, it is known to provide a drum brake assembly with a parking and emergency brake actuation cable which is oriented generally perpendicular to the backing plate or parallel to the axle of the vehicle.

One example of a drum brake assembly having a parking and emergency brake actuation cable oriented in this manner is disclosed in U.S. Pat. No. 4,018,312 to Muramoto et al. As shown in this patent, the parking and emergency brake actuation cable is oriented generally perpendicular to the backing plate of the brake assembly so as to avoid interference with rear suspension elements of the vehicle. The cable is connected to a four-joint link assembly which is operative to engage and actuate the brake shoes when the cable is actuated.

Other examples of drum brake assemblies having a parking and emergency brake actuation cable oriented generally perpendicular to a backing plate of the brake assembly are disclosed in U.S. Pat. No. 3,870,131 to Firth et al., U.S. Pat. No. 3,023,853 to Nawrot, U.S. Pat. No. 2,259,266 to Rabe, and U.S. Pat. No. 2,006,494 to Bendix et al.

SUMMARY OF THE INVENTION

This invention relates to an improved operating mechanism for a vehicle drum brake wherein the end of the parking and emergency brake actuation cable is supported generally perpendicular to the backing plate of the brake assembly. Such an operating mechanism can advantageously be used to actuate a drum-in-hat type parking brake assembly of a hydraulic disc brake. The improved actuating mechanism can effectively be utilized on a vehicle having a wide rear wheel rim, or on a vehicle having tandem rear wheels, i.e., a semi-vehicle or a recreational vehicle.

The drum-in-hat parking and emergency brake assembly includes a mounting flange for securing the brake assembly to a vehicle component. A hollow abutment block, a backing plate, and a caliper supporting anchor plate are secured to the mounting flange. Preferably, at least the mounting flange and hollow abutment are integrally cast with one another. A pair of arcuate drum brake shoes are supported relative to the backing plate. The hollow abutment block is located on the mounting flange between a pair of adjacent ends of the brake shoes. According to one feature of the present invention, the operating mechanism is at least partially disposed in the chamber for engaging and actuating the brake shoes, and is coupled to an actuation cable having an end portion supported in a generally perpendicular relationship relative to the backing plate. According to another feature of the present invention, the operating mechanism includes at least two juxtaposed elongated links disposed between the brake shoes each including an angled elongated slotted opening formed therein, and an actuating arm oriented generally perpendicular to the links. The actuating arm is engageable with each of the slotted openings for effecting lengthwise movement of the links in opposite directions to engage and cause outward movement of the brake shoes when the actuating arm is moved generally perpendicularly in one direction relative to the links.

Other objects and advantages of this invention will become apparent to those skilled in the art from the following detailed description of the preferred embodiment, when read in light of the accompanying drawing.

DETAILED DESCRIPTION OF THE PREFERRED EMBODIMENT

Figure 1:
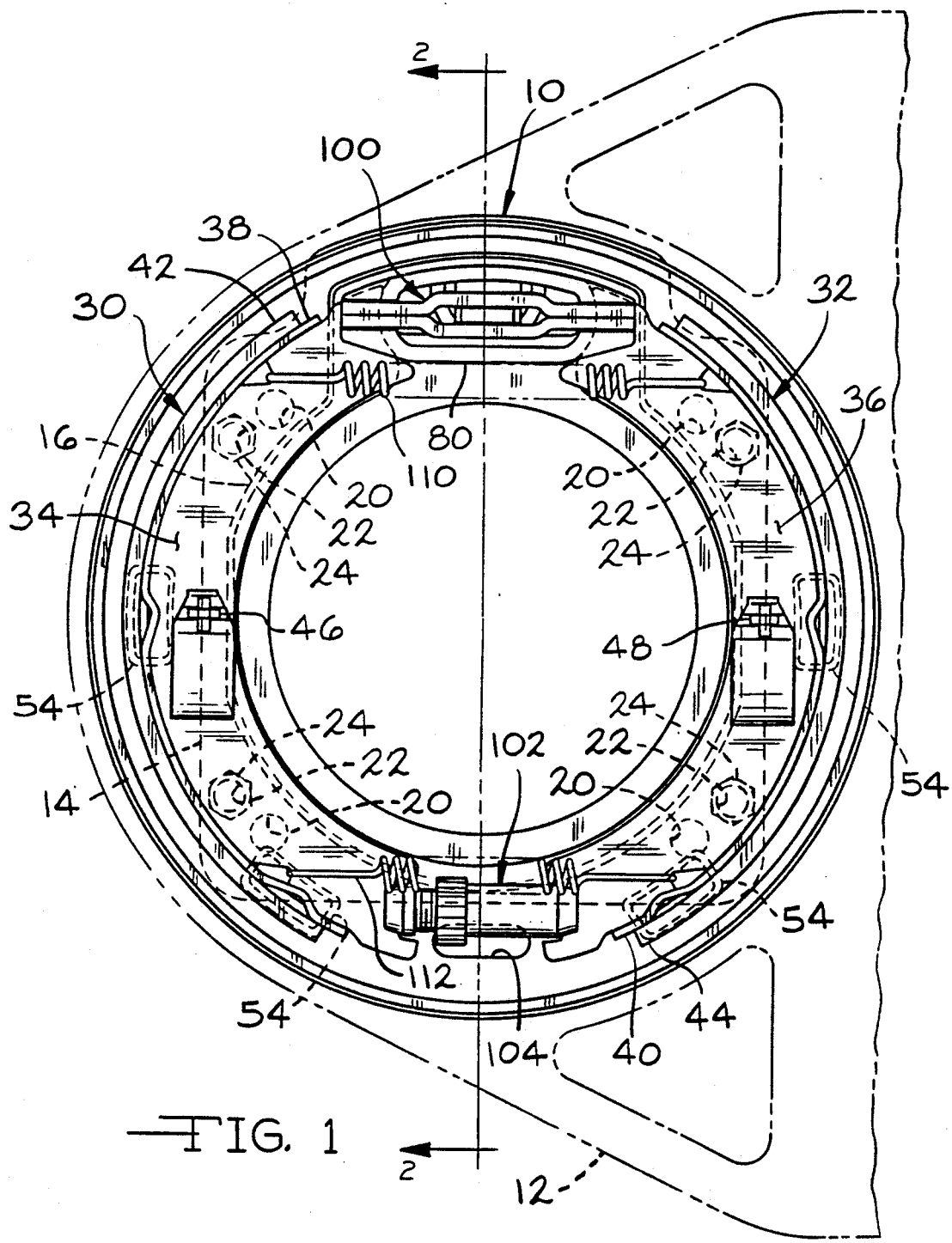
FIG. 1 is an outboard view of a drum-in-hat parking and emergency brake assembly of a hydraulic disc brake constructed in accordance with the present invention.

Referring now to the drawings, there is illustrated in FIG. 1 an outboard side of a drum-in-hat parking and emergency brake assembly, indicated generally at 10, of a hydraulic disc brake, and constructed in accordance with the present invention. The brake assembly 10 includes a caliper supporting anchor plate 12, a mounting flange 14, and a backing plate 16. The anchor plate 12 is provided with a pair of opposed arms (not shown) which include guide rails (not shown) for supporting a caliper (not shown) of the disc brake. The disc brake assembly includes a generally hat-shaped rotor 18, best shown in FIG. 2.

The mounting flange 14 is provided with a plurality of first openings (not shown) and a plurality of second openings 20 formed therein. The backing plate 16 is provided with a plurality of openings 22 formed therein. The openings 22 in the backing plate 16 are coaxial with the first openings in the mounting flange 14 when the backing plate 16 is disposed adjacent the mounting flange 14. Bolts 24 extend through the first openings of the mounting flange 14 and the openings 22 of the backing plate 16 to secure the backing plate 16 to the mounting flange 14.

The anchor plate 12 is provided with a plurality of openings (not shown) formed therein. Bolts (not shown) extend through the second openings 20 of the mounting flange 14, through the openings of the anchor plate 12, and through a vehicle component (not shown), to secure the brake assembly 10 to the associated vehicle component.

The brake assembly 10 includes a first brake shoe 30 and an oppositely disposed second brake shoe 32. The first and second brake shoes 30 and 32 include webs 34 and 36, respectively, having arcuate tables 38 and 40. An arcuate friction pad 42 is secured to the first brake shoe table 38, and an arcuate friction pad 44 is secured to the second brake shoe table 40. The first and second brake shoes 30 and 32 are secured to the backing plate 16 by pins 46 and 48, respectively. The pins 46 and 48 extend through apertures (not shown) formed in the backing plate 16, and through apertures 50 and 52, respectively, formed in the webs 34 and 36 of the brake shoes 30 and 32, best shown in FIG. 3.

The backing plate 16 includes a plurality of raised pads 54 formed thereon, best shown in FIG. 1. The pads 54 engage the inboard sides of the tables 38 and 40 of the brake shoes 30 and 32, respectively, to support the brake shoes 30 and 32 relative to the backing plate 16.

Figure 3:
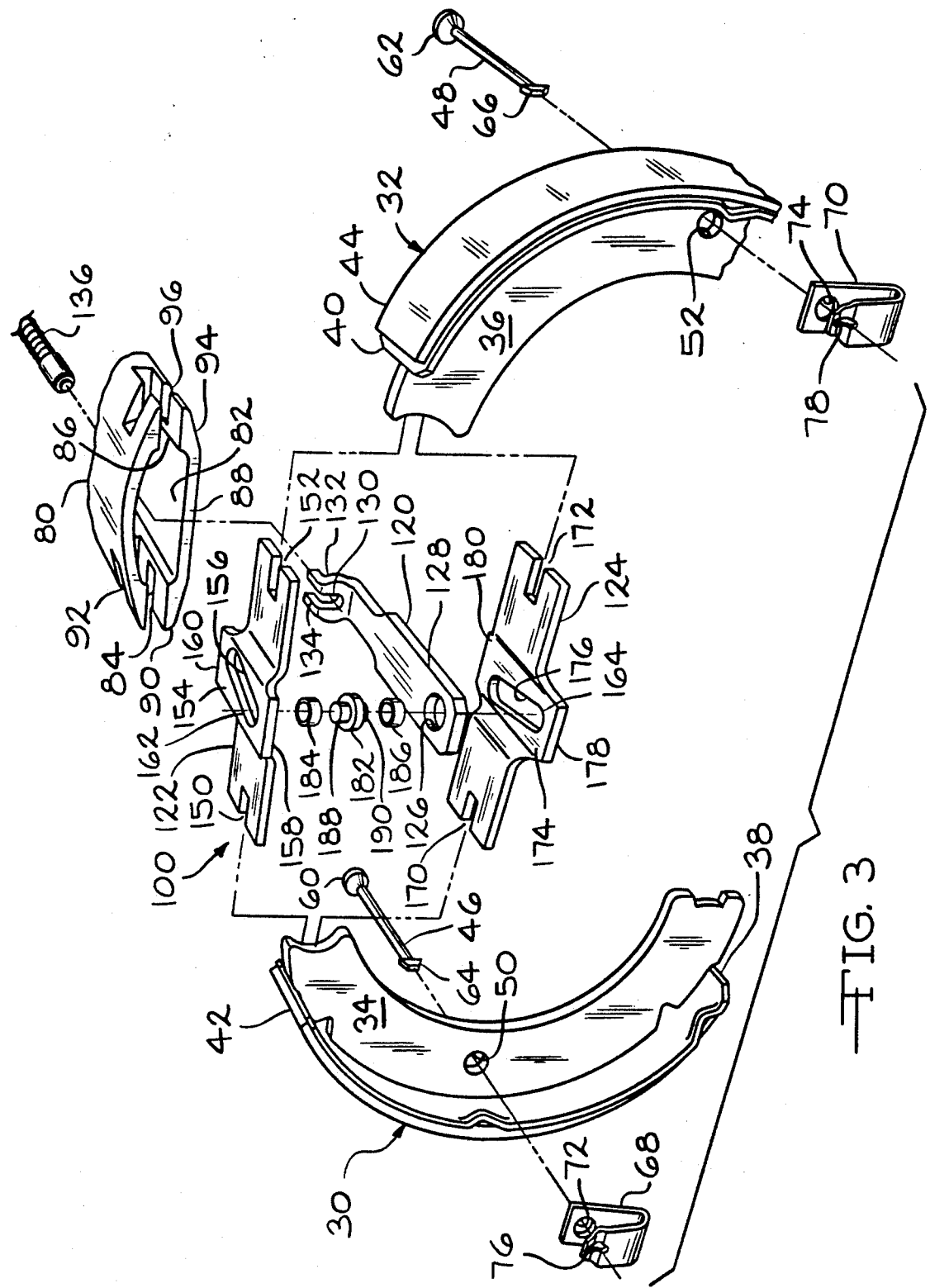
FIG. 3 is an exploded perspective view of some of the components of the brake assembly.

As shown in FIG. 3, the pins 46 and 48 are provided with enlarged heads 60 and 62, and flattened, wedge-shaped opposite ends 64 and 66, respectively. The enlarged heads 60 and 62 of the pins 46 and 48, respectively, engage the inboard side of the backing plate 16. The body portions of the pins 46 and 48 extend through the webs 34 and 36 of the brake shoes 30 and 32, and through a generally U-shaped spring-clip retainer 68 and 70 to secure the brake shoes 30 and 32 to the backing plate 16.

The U-shaped spring-clip retainers 68 and 70 are provided with a pair of apertures 72 and 74, and a pair of slots 76 and 78, respectively. The flattened, wedge-shaped ends 76 and 66 of the pins 46 and 48 extend through the apertures 72 and 74 and the slots 76 and 78, and then are turned ninety degrees while the spring-clips 68 and 70 are compressed, and held stationary. The spring-clips 68 and 70 are then released, and the wedge-shaped ends 64 and 66, respectively, are received within depressions formed in the slots 76 and 78 of the spring-clips 68 and 70, thereby securing the brake shoes 30 and 32 to the backing plate 16.

The mounting flange 14 includes a hollow abutment block 80 which prevents rotation of the brake shoes 30 and 32 in either direction when the parking and emergency brake is engaged, and also partially encloses a parking and emergency brake operating mechanism, indicated generally at 100. Preferably, the abutment block 80 is cast integrally with the mounting flange 14.

The hollow abutment block 80 defines a chamber 82, best shown in FIG. 3, having a pair of opposed slots 84 and 86 formed in an outboard side 88 thereof. The slot 84 extends from the chamber 82 through a left hand portion 90 of the abutment block 80, and the slot 86 extends from the chamber 82 through a right hand portion 94 of the abutment block 80.

The left hand portion 90 of the abutment block is slotted at 92 for receiving the upper portion of the web 34 of brake shoe 30. Also, the right hand portion 94 of the abutment block 80 is slotted at 96 for receiving the upper portion of the web 36 of brake shoe 32. Thus, the reception of the upper ends of the webs 34 and 36 of the brake shoes 30 and 32, respectively, in the slots 92 and 96 of the abutment block 80 supports the upper ends of the brake shoes since no raised pads 54 are provided on the upper portion of the backing plate 16. In addition, the mounting flange 14 defines a bearing hub 98 for supporting a vehicle component, such as for example, a axle drive shaft 298, shown in phantom in FIG. 2.

An adjuster mechanism 102 is disposed between the lower ends of the brake shoes 30 and 32. The adjuster mechanism 102 automatically compensates for wear of the friction pads 42 and 44 of the brake shoes 30 and 32, respectively, and can be of the type disclosed in U.S. Pat. No. 5,180,037 to Evans. An access hole 104 is provided in the backing plate 16 to allow adjustment of the adjuster mechanism 102. A plug 106, shown in FIG. 2, in installed in the access hole 104 to close the hole.

Further, the brake assembly 10 includes an upper retracting spring 110 and a lower retracting spring 112. The upper retracting spring 110 is disposed adjacent the hollow abutment block 80 and connected between the upper ends of the webs 34 and 36 of the brake shoes 30 and 32, respectively. The lower retracting spring 112 is disposed adjacent the automatic adjuster mechanism 102 and connected between the lower ends of the webs 34 and 36 of the brake shoes 30 and 32, respectively.

The parking and emergency brake operating mechanism 100, best shown in FIG. 3, includes an actuating arm or lever 120, an upper link 122, and a lower link 124. The actuating arm 120 extends generally perpendicular to the links 122 and 124, and includes an outboard end 128 and an inboard end 132. The inboard end 132 extends generally at a right angle relative to the outboard end 128. An aperture 126 is formed near a remote end of the outboard end 128, and a slotted opening 130 is formed in a remote end of the inboard end 132. The inboard end 130 includes a rolled back remote end 134.

Figure 2:
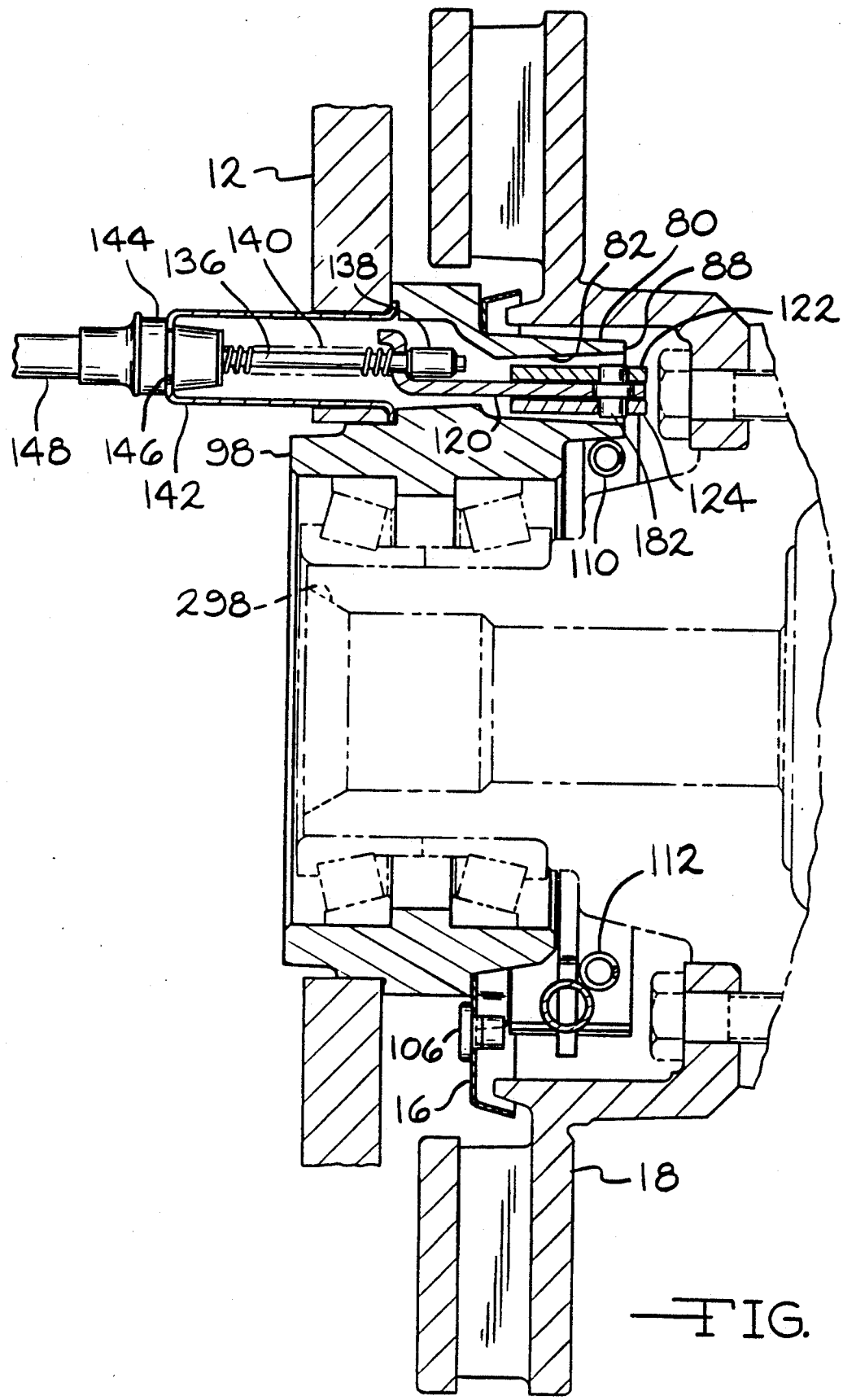
FIG. 2 is a sectional view taken along line 2—2 of FIG. 1, including a partial section of a disc brake rotor of the hydraulic disc brake, and showing the operating mechanism for actuating the brake shoes of the parking and emergency brake assembly in an OFF, or disengaged, position.

A parking and emergency brake actuation cable 136, best shown in FIG. 2, extends through the slotted opening 130 of the actuating arm 110, and a fastener 138 is installed on the end of the cable 136. When so assembled, the actuation cable 136 is supported by the actuating arm 110 in a generally perpendicular relationship relative to the backing plate 16. The opposite end (not shown) of the cable 136 usually extends to a driving compartment of the vehicle, and is connected to a known device (not shown) which is actuable by an operator of the vehicle for operating the parking and emergency brake.

As shown in FIG. 2, the cable 136 is surrounded by a compression spring 140. The compression spring 140 normally biases the actuating arm 110 to the position shown in FIGS. 2 and 4, wherein the parking and emergency brake is in an OFF or released position. The rolled back end 134 of the actuating arm 110 aids in maintaining the spring 140 in place. An elongated cover 142 is attached to the backing plate 16 to cover the cable 136 and spring 140. An elastomeric seal 144 is mounted in an opening 146 formed in the cover 142, and a protective sheath 148 surrounds that portion of the cable 136 which is located outside of the cover 142.

Figure 8:
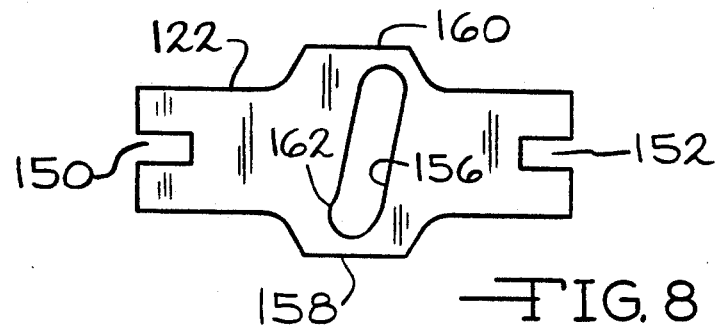
FIG. 8 in a view of one of the links of the operating mechanism.

The upper link 122 is generally flat and elongated and includes a pair of opposed slotted ends 150 and 152, and a center section 154 which is offset relative to the ends. The upper link 122 includes an angled elongated slotted opening 156 formed in the center section 154 thereof. As best shown in FIG. 8, the angled slotted opening 156 of the upper link 122 includes a non-linear portion at 162.

Figure 6:
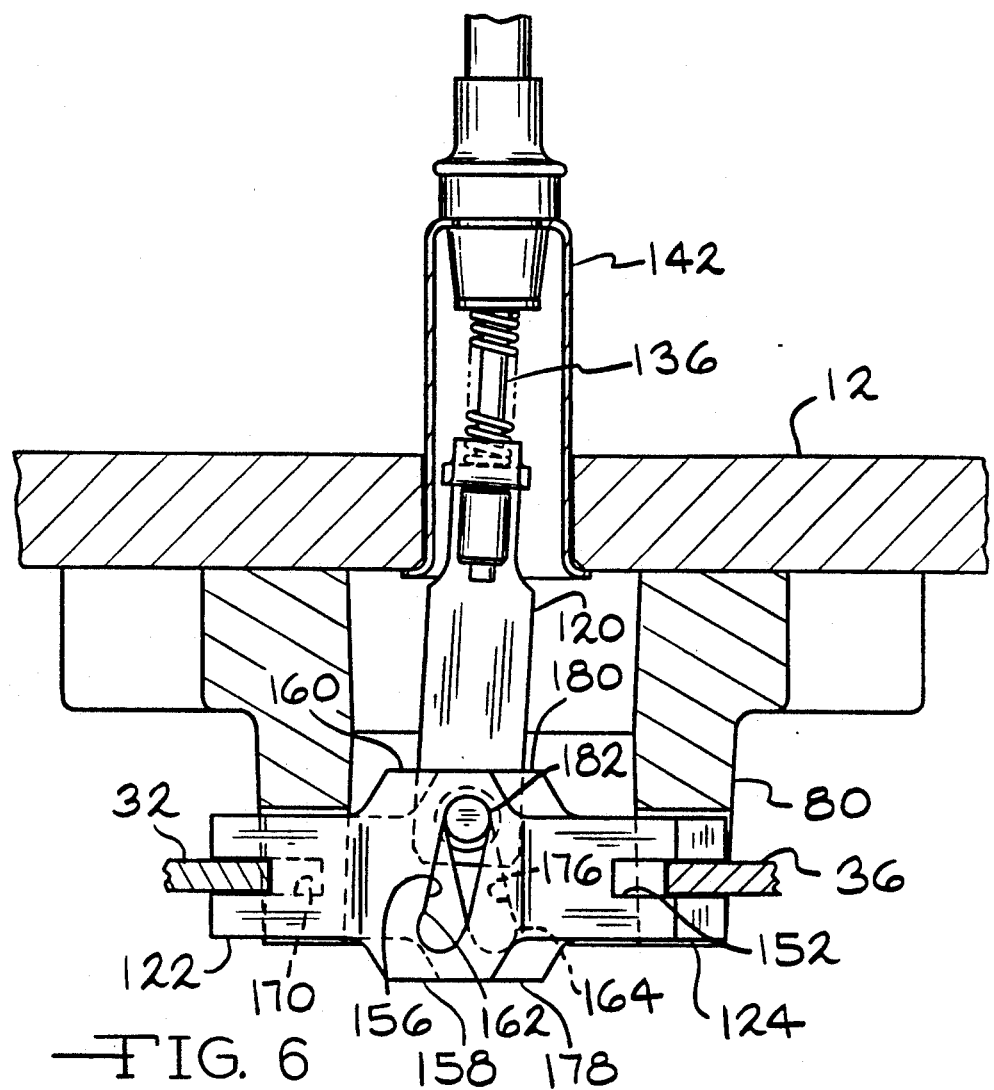
FIG. 6 is a view similar to FIG. 4 and showing the operating mechanism in a "full stroke" ON, or engaged, position.

The lower link 124 is identical to the upper link 122 and includes a pair of opposed slotted ends 170 and 172, and a center section 174 which is offset relative to the ends. The lower link 124 includes an angled elongated slotted opening 176 formed in the center section 174 thereof. As best shown in FIG. 6, the angled slotted opening 176 of the lower link 124 includes a non-linear portion at 164. As will be discussed below, when the cable 136 is pulled, the non-linear portions 162 and 164 of the links 122 and 124, respectively, are effective to provide the operating mechanism 100 with a "quick lift" or "quick take-up" of the normal brake running clearance.

As shown in FIGS. 1 and 2, the links 122 and 124 are positioned in the chamber 82 of the abutment block 80 with the offset center portions 158 and 178 thereof extending away from one another. By positioning the links 122 and 124 in this manner, an opening is defined between the center portions of the links 122 and 124 for receiving the outboard end 128 of the actuating arm 120. A generally elongated cylindrical fastener or pin 182, shown in FIG. 3, and preferably having a pair of flanged bushings 184 and 186 installed on opposed reduced diameter ends 188 and 190, respectively, is inserted in the slotted openings 156 and 178 of the links 122 and 124, respectively, and in the opening 126 of the actuating arm 120 to secure the arm 120 and the links 122 and 124 together.

When the operating mechanism 100 is positioned in this manner, the upper end of the web 34 of the brake shoe 30 is disposed in the slotted ends 150 and 170 of the upper and lower links 122 and 124, respectively, and in the left-handed slot 92 of the abutment block 80. The upper end of the web 36 of the brake shoe 32 is disposed in the slotted ends 152 and 172 of the upper and lower links 122 and 124, respectively, and in the right-handed slot 96 of the abutment block 80. Also, the links 122 and 124 of the operating mechanism 100 are held in the slots 84 and 86 by the upper ends of the webs 34 and 36 of brake shoes 30 and 32, respectively, but are free to move longitudinally by operation of the actuating arm 120.

Figure 4:
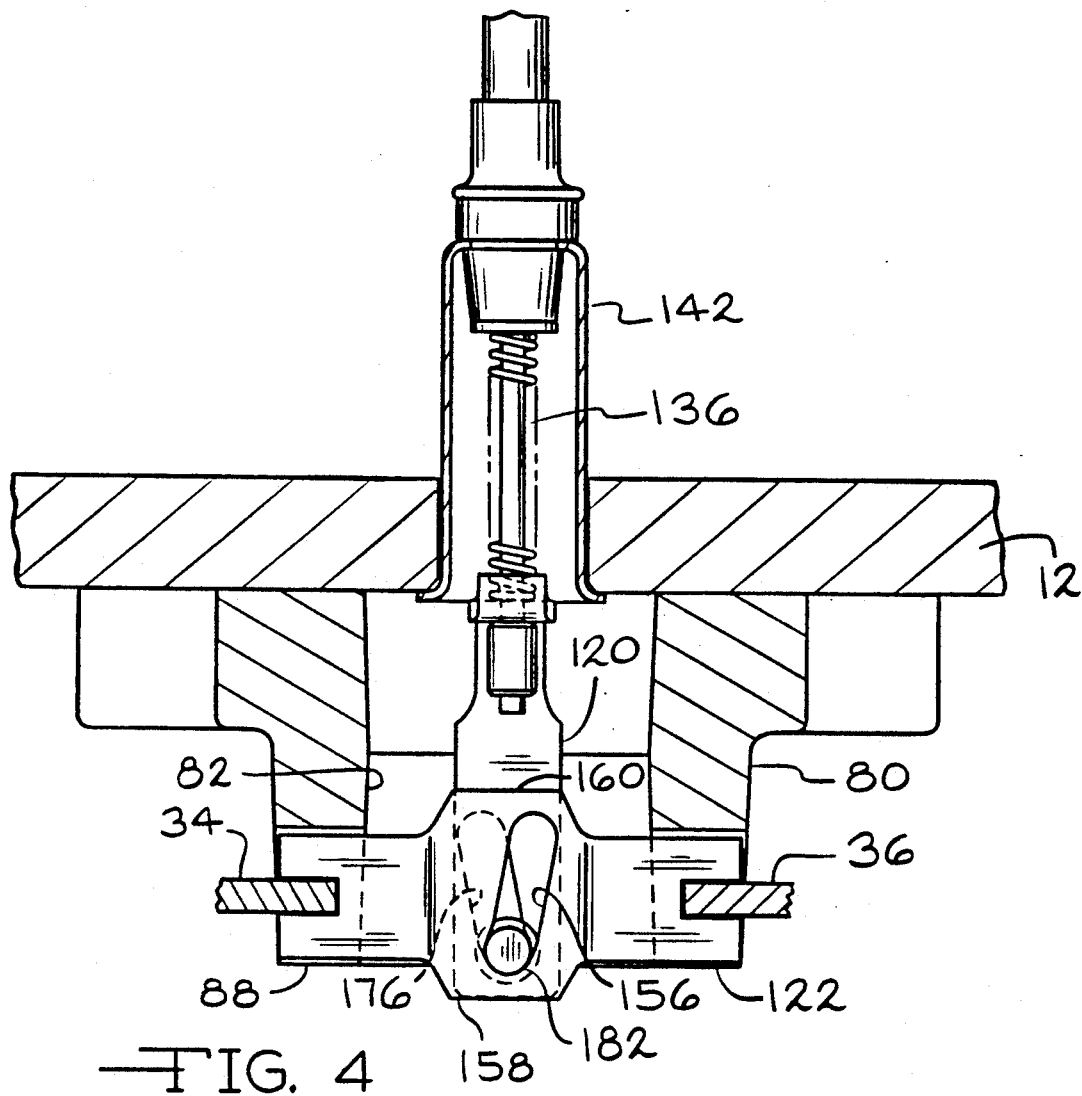
FIG. 4 is a view of the upper portion of FIG. 1 and showing the operating mechanism in the OFF, or disengaged, position.
Figure 5:
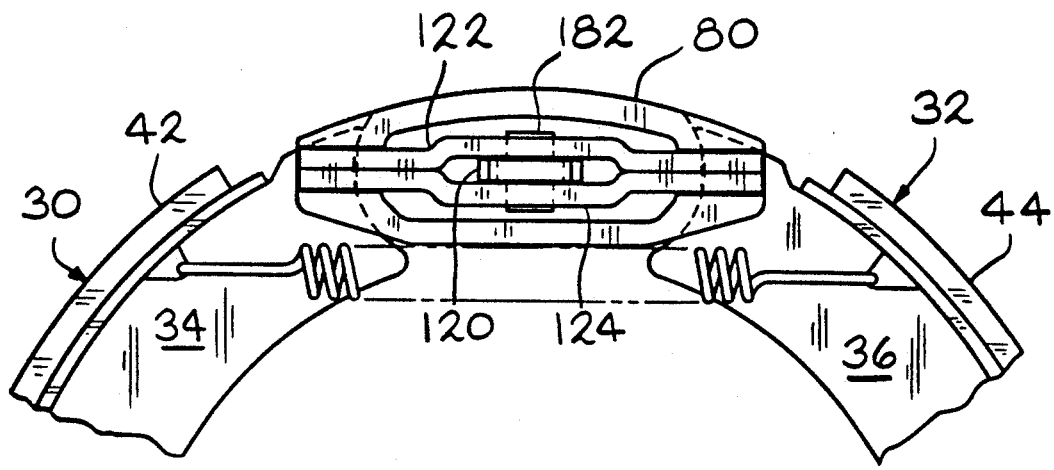
FIG. 5 is a front view of the upper portion of FIG. 1 and showing the operating mechanism in the OFF, or disengaged, position.

Turning now to FIGS. 4 to 7, the operation of the parking and emergency brake operating mechanism 100 will be discussed. FIGS. 4 and 5 illustrate the position of the operating mechanism 100 when the parking and emergency brake is in an OFF, or released, position. As shown therein, when the parking and emergency brake is released, the actuating arm 120 is biased by the compression spring 134 toward the outboard side 88 of the abutment 80 so that the links 122 and 124 are in an inoperative position. In this position, the links 122 and 124 do not exert any outward force on the brake shoes 30 and 32.

Also, when the brake is in the released position, the pin 182 connecting the links 122 and 124 and the actuating arm 120 is adjacent the outboard sides 158 and 178 of the links 122 and 124, respectively, and disposed in angled slotted openings 156 and 176 of the links 122 and 124, respectively, having the non-linear portions 162 and 164. In this position, the links 122 and 124 form a generally V-shape which diverges toward the inboard sides 160 and 180 of the links 122 and 124, respectively.

Figure 7:
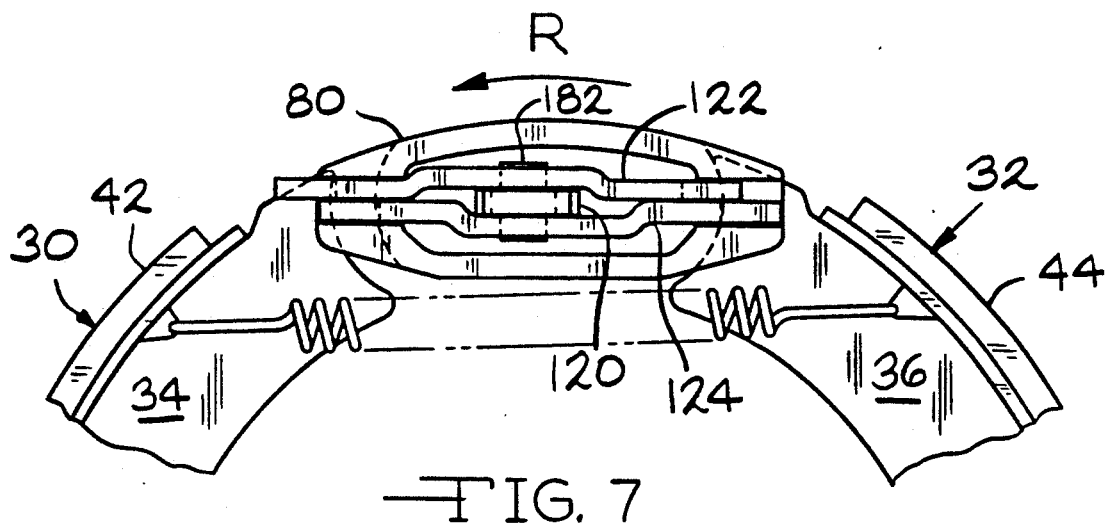
FIG. 7 is an view similar to FIG. 5 and showing the operating mechanism in the "full stroke" ON, or engaged, position.

FIGS. 6 and 7 illustrate the position of the operating mechanism 100 when the parking and emergency brake is in a "full stroke" ON, or engaged, position, and the vehicle tends to rotate in a counterclockwise direction denoted by the arrow R shown in FIG. 7. The term "full stroke" meaning the amount of movement which the operating mechanism 100 is capable of due to the configuration of the components thereof. Thus, it is obvious to those skilled in the art that in actual use, when the parking and emergency brake is in the engaged position, the operating mechanism 100 does not usually move to the "full stroke" position.

When the cable 136 is pulled in a direction generally perpendicular to the anchor plate 12 to the full stroke engaged position, the actuating arm 120 via the pin 182 moves within the slotted openings 156 and 176 of the links 122 and 124, respectively, away from the anchor plate 12, and therefore, away from the backing plate 16. As shown in FIGS. 6 and 7, as a result of this movement, the actuating arm 120 causes the links 122 and 124 to move outwardly into engagement with the webs 34 and 36 of the brake shoes 30 and 32, respectively, thereby forcing the friction pads 42 and 44 of the brake shoes 30 and 32, respectively, against a brake drum (not shown) of the brake assembly 10.

In addition, due to the non-linear portions 162 and 164 of the slotted openings 156 and 176, respectively, as the cable 136 is initially moved from the release position shown in FIGS. 4 and 5 to the engaged position shown in FIGS. 6 and 7, a relatively small amount of cable 136 movement results in a proportionately large amount of lengthwise movement of the links 122 and 124 in opposite directions. As a result of this, the links 122 and 124 quickly take up the normal running clearance between the friction pads 42 and 44 of the brake shoes 30 and 32, respectively, and the brake drum during the initial actuation of the cable 136. Further cable 136 actuation moves the arm 120 via the pin 182 in the slotted openings 156 and 176 of the links 122 and 124, respectively, thereby forcing the brake shoes 30 and 32 against the brake drum. However, the amount of lengthwise movement of the links 122 and 124 in response to this further actuation of the cable 136 is not proportionately as great as that which occurs during the above-described initial actuation of the cable 136.

Once the brake assembly 10 is engaged, rotation of the vehicle 10 in the counterclockwise direction R causes the brake shoe 30 to rotate therewith and move the upper end of the brake shoe 30 away from engagement the abutment block 80. The upper end of the other brake shoe 32 is engaged with the abutment block 80 preventing rotation of the shoe 32. If the vehicle tended to rotate in a clockwise direction, the brake shoe 32 would rotate therewith causing the upper end thereof to move away from engagement with the abutment block 80, while the upper end of brake shoe 30 remains in engagement with the abutment block 80 preventing rotation of brake shoe 30.

As best shown in FIG. 6, when the parking and emergency brake is engaged, the pin 182 connecting the links 122 and 124 and the actuating arm 120 is adjacent the inboard sides 160 and 180 of the links 122 and 124, respectively, so that the slots 156 and 176 form a generally V-shape which diverges toward the outboard sides 158 and 178 of the links 122 and 124.

Figure 9:
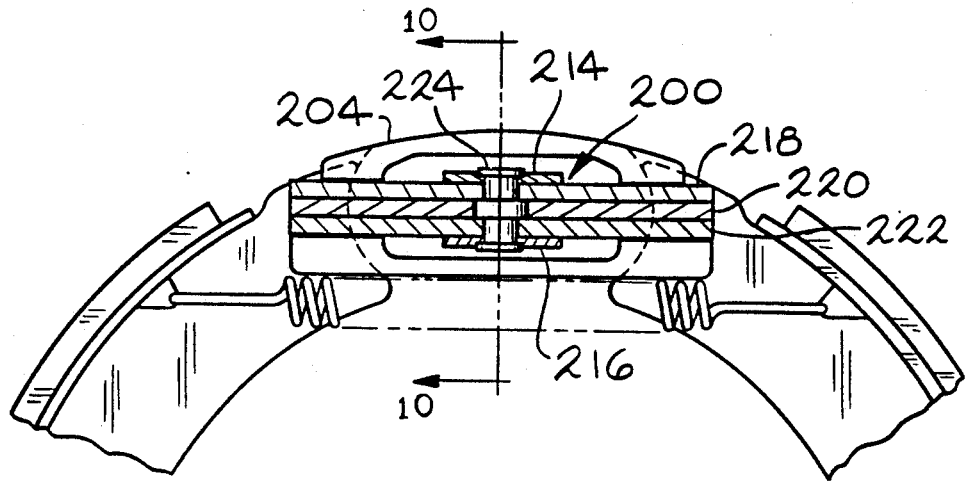
FIG. 9 is a view similar to FIG. 5 and showing an alternate embodiment of the operating mechanism.
Figure 10:
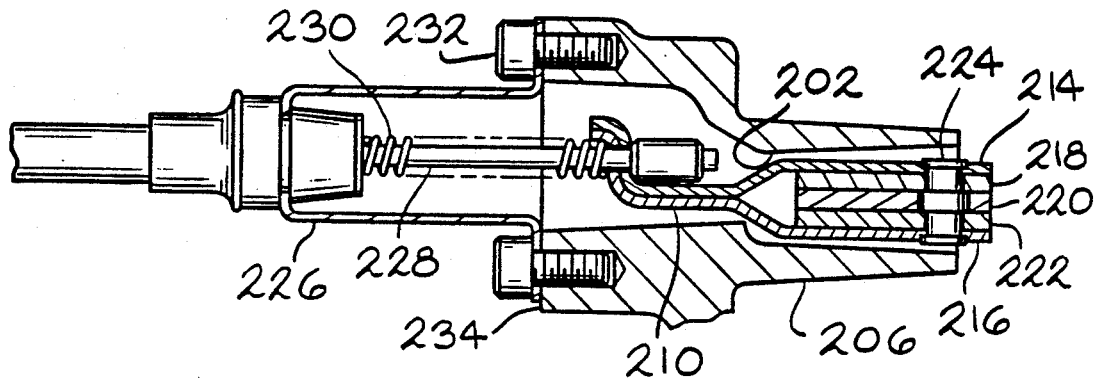
FIG. 10 is a sectional view taken along line 10—10 of FIG. 9.

FIGS. 9 and 10 illustrate an alternate embodiment of a parking and emergency brake operating mechanism 200 which is partially disposed in a chamber 202 of a hollow abutment 204 of a mounting flange 206, and which is in the released position. As shown therein, the operating mechanism 200 includes an actuating arm or lever 210 having a bifurcated outboard end 212 which defines spaced apart arms 214 and 216, and three juxtaposed links 218, 220, and 222, which are "sandwiched" between the arms 214 and 216 of the actuating arm 210.

The operating mechanism 200 further includes a fastener or pin 224 which extends through the arms 214 and 216, and the links 218, 220, and 222 to connect the actuating arm 210 and the links 218, 220, and 222 together. A cover 226 enclosing a cable 228 and compression spring 230 is connected to an inboard side 232 of the abutment by a plurality of bolts 234.

In operation, actuation of the cable 228 causes the actuating arm 210 to move the middle link 220 in a first direction, and to move the upper and lower links 218 and 222 in a second opposite direction. As a result of this movement, the middle link 220 engages a web of one of the brake shoes, and the upper and lower links 218 and 222 engage the web of the other brake shoe, thereby moving the friction surfaces of the brake shoes into engagement with the brake drum.

One advantage of the present invention is that the links of the operating mechanism are identical to one another. Thus, the cost of manufacturing and/or the possibility of incorrectly assemblying these components is reduced. Also, by providing the slotted openings of the links with non-linear portions, only a relatively minimum amount of cable travel is needed to take up the brake running clearance.

It must be understood that while the invention has been described and illustrated as being used on a drum-in-hat parking brake assembly, the improved operating mechanism can be used on other types of drum brake assemblies not of the drum-in-hat type. When used in a drum brake assembly not of the drum-in-hat type, the caliper supporting anchor plate is not necessary, and the mounting flange can be cast integrally with the backing plate. When used in the drum-in-hat type of brake assembly, the mounting flange can be cast integrally with the backing plate, the caliper supporting anchor plate, or both.

In addition, while the links have been described and illustrated as being formed with slotted openings having non-linear portions to provide the operating mechanism with a "quick lift" advantage, these non-linear portions can be eliminated. Also, the operating mechanism of the present invention can include different arm and links arrangements in order to actuate and engage the brake shoes so long as the cable for operating the actuating arm is oriented generally perpendicular to the backing plate of the brake assembly.

In accordance with the provisions of the patent statutes, the principle and mode of operation of this invention have been described and illustrated in its preferred embodiment. However, it must be understood that the invention may be practiced otherwise than as specifically explained and illustrated without departing from its spirit or scope.

What is claimed:

1. A drum brake assembly comprising:
   a mounting flange for securing the brake assembly to a vehicle component;
   a hollow abutment block secured to said mounting flange and defining a chamber;
   a backing plate secured to said mounting flange;
   a pair of arcuate drum brake shoes supported relative to said backing plate;
   an actuation cable having an end portion supported in a generally perpendicular relationship relative to said backing plate;
   said hollow abutment block located on said mounting flange between a pair of adjacent ends of said brake shoes; and
   operating means at least partially disposed in said chamber for engaging and actuating said brake shoes, said operating means coupled to said actuation cable and operative to actuate said brake shoes when said actuation cable is pulled.

2. The brake assembly according to claim 1 wherein said operating means further includes an actuating arm operatively coupled to said actuation cable.

3. The brake assembly according to claim 2 wherein said chamber includes a pair of opposed slots extending from said chamber through opposite ends of said abutment block, and said operating means further includes at least two links extending through said pair of opposed slots and operatively coupled to said actuating arm, whereby when said actuation cable is pulled said actuating arm moves perpendicularly in one direction relative to said links to effect lengthwise movement of said links in opposite directions to engage and cause outward movement of said brake shoes.

4. The brake assembly according to claim 3 wherein each of said links includes an angled elongated slotted opening formed therein.

5. The brake assembly according to claim 4 wherein said angled elongated slotted opening is non-linear and includes a first section which produces a first amount of lengthwise movement of said links in opposite directions when said cable is pulled, and a second section which produces a second amount of lengthwise movement of said links in opposite directions which is proportionately less than said first amount of movement when said cable is further pulled.

6. An operating mechanism for a drum brake assembly having a pair of opposed arcuate brake shoes each including an arcuate web, said operating mechanism comprising:
   at least two juxtaposed elongated links disposed between said brake shoes each including an angled elongated slotted opening formed therein; and
   an actuating arm oriented generally perpendicular to said links and including a pin carried by said actuating arm and extending into each of said slotted openings of said links for operatively connecting said actuating arm to said links, said actuating arm effecting lengthwise movement of said links in opposite directions to engage and cause outward movement of said brake shoes when said actuating arm is moved generally perpendicularly in one direction relative to said links.

7. The operating mechanism as claimed in claim 6 wherein said angled elongated slotted opening is non-linear and includes a first section which produces a first amount of lengthwise movement of said links in opposite directions when said actuating arm is moved in said one direction, and a second section which produces a second amount of lengthwise movement of said links in opposite directions which is proportionately less than said first amount of movement when said actuating arm is further moved in said one direction.

8. The operating mechanism as claimed in claim 6 wherein one of said links includes a first slotted end for receiving said web of one of said brake shoes and includes an opposite second slotted end for receiving said web of the other one of said brake shoes, and the other one of said links includes at least a first slotted end for receiving said web of said one of said brake shoes.

9. The operating mechanism as claimed in claim 8 wherein said other one of said links includes an opposite second slotted end for receiving said web of said other one of said brake shoes.

10. The operating mechanism as claimed in claim 6 wherein said actuating arm is a reciprocating arm having an aperture formed therein, and said means engageable with each of said slotted openings is a pin extending through said aperture and said slotted openings for connecting said arm and said links at a common point.

11. A drum-in-hat parking brake assembly for a hydraulic disc brake comprising:
   a mounting flange for securing the brake assembly to a vehicle component and having a hollow abutment block cast integrally therewith;
   a backing plate secured to said mounting flange;
   a caliper supporting anchor plate secured to said mounting flange;
   a pair of arcuate drum brake shoes supported relative to said backing plate;
   said hollow abutment block located on said mounting flange between a pair of adjacent ends of said brake shoes, and defining a chamber having a pair of opposed slots extending from said chamber through opposite ends of said abutment block; and
   operating means at least partially disposed in said chamber for engaging and actuating said brake shoes, said operating means including at least two links extending in opposite directions through said pair of opposed slots and operatively coupled to said brake shoes, whereby lengthwise movement of said links in opposite directions causes said links to engage and actuate said brake shoes.

12. The brake assembly according to claim 11 wherein each of said brake shoes includes and arcuate web and one of said links includes a first slotted end for receiving said web of one of said brake shoes and an opposite second slotted end for receiving said web of the other one of said brake shoes, and the other one of said links includes at least a first slotted end for receiving said web of said one of said brake shoes.

13. The brake assembly according to claim 12 wherein said other one of said links includes an opposite second slotted end for receiving said web of said other one of said brake shoes.

14. The brake assembly according to claim 11 wherein said operating means further includes an actuation cable operatively coupled to said links, said actuation cable having an end portion supported in a generally perpendicular relationship relative to said backing plate.

15. The brake assembly according to claim 14 wherein said operating means further includes an actuating arm operatively coupled to said actuation cable and oriented generally perpendicular to said backing plate.

16. The operating mechanism as claimed in claim 15 wherein said actuating arm is a reciprocating arm and said links are operatively coupled to said arm at a common point.

17. The brake assembly according to claim 11 wherein each of said links an angled elongated slotted opening formed therein.

18. The brake assembly according to claim 17 wherein said angled elongated slotted opening is non-linear and includes a first section which produces a first amount of lengthwise movement of said links in opposite directions when said operating means is actuated, and a second section which produces a second amount of lengthwise movement of said links in opposite directions which is proportionately less than said first amount of movement when said operating means is further actuated.

* * * * *